Jan. 3, 1928.

A. C. TAYLOR 1,654,562

ELECTRIC FLASH WELDING OR HEATING MACHINE

Filed Oct. 3, 1923

Inventor

A. C. TAYLOR

By Fisher, Moser & Twork

Attorneys

Patented Jan. 3, 1928.

1,654,562

UNITED STATES PATENT OFFICE.

ALBERTIS C. TAYLOR, OF WARREN, OHIO.

ELECTRIC FLASH WELDING OR HEATING MACHINE.

Application filed October 3, 1923. Serial No. 666,228.

This invention relates to an improvement in electric welding and heating machines, and in general the object of the invention is to provide an electric welding or heating machine in which a transformer is located relatively as near as possible to the work or point where the actual heating or welding of the parts takes place, but in a protected position at one side of the welding gap of the machine and removed from the zone of flying and dropping particles of molten metal and scale produced in heating and welding operations, especially flash welding operations. Thus, in practicing what is known as the flash welding method with a butt-welding type of machine, a welding heat is produced by creating an arc between the parts to be welded. In so doing thousands of fine particles of molten metal are thrown off and scattered broadcast, which if permitted to strike or come in contact with the primary coil of the transformer will eventually affect the insulation of said coil and tend to produce a short circuit therein, thereby placing the machine out of commision and making expensive repairs necessary. To meet this situation I provide a protecting device as hereinafter described for the transformer, and inasmuch as the transformer becomes heavily magnetized when in operation this device also functions to prevent the fine particles of molten steel from being attracted to it. Furthermore, as the secondary voltage used for flash welding is very low, generally being only five or six volts, and heavy conductors are required to carry the current, the transformer is preferably placed as close as possible to the work to shorten the conductors and prevent large losses of electric current. On account of the low voltage the machine is also particularly constructed to have as few joints as possible in the path of the secondary circuit, because it is practically impossible to produce joints that will carry the low voltage without loss of current and heating of the joints.

Figure 1:
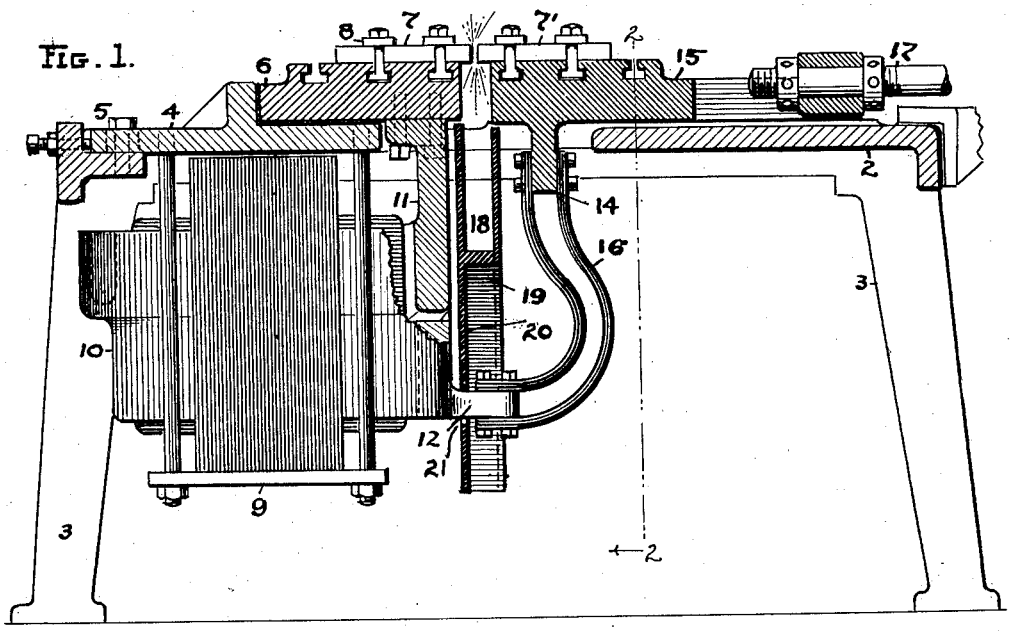
Figure 2:
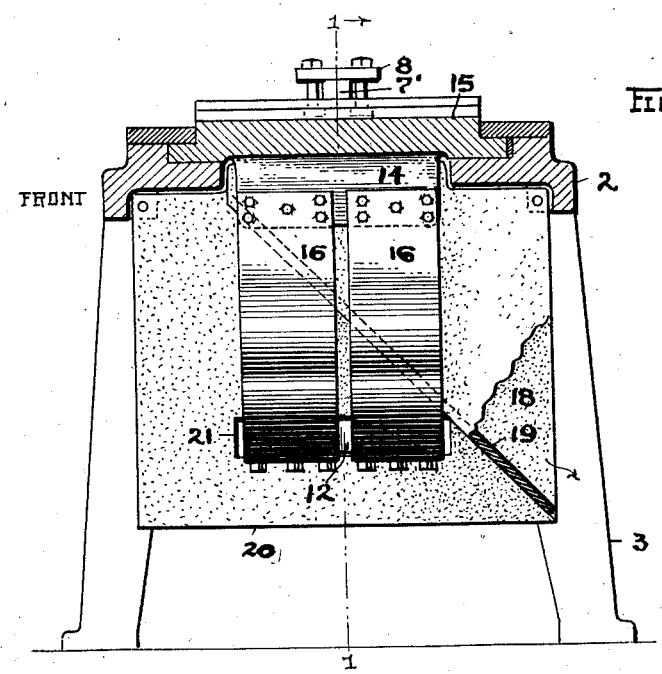

In the accompanying drawing Fig. 1 is a vertical section longitudinally of my improved welding machine on line 1—1 of Fig. 2.

Fig. 2 is a vertical section transversely of the machine on line 2—2 of Fig. 1.

The machine exemplified in the drawing, comprises a heavy cast-metal bed plate 2 supported upon legs 3. A separate table 4 may be adjustably secured by bolts 5 to the top of the bed plate at one end of the machine, or this table may be made an integral or fixed part of the bed plate. A heavy copper platen 6 with a rabbeted flat top is secured in any suitable way in an insulated position upon table 4, and one of the metal pieces or parts 7 to be welded may be secured by suitable clamping devices 8 in a projecting position at the inner end of platen 6. The electric transformer 9 is bolted to or suspended from table 4 or bed plate 2 directly underneath platen 6, and I prefer to use a water-cooled transformer having a heavy copper secondary 10 which is horizontally arranged and provided with independent integral extensions 11 and 12 adapted to serve as separate electric terminals. Thus, terminal 11 extends upwardly from one overlapping end of secondary 10 and is bolted directly to the bottom of the work holder or copper platen 6, whereas terminal 12 extends forwardly from the underlapping end of the secondary and is connected to a depending rib or lug 14 of the movable platen and work holder 15 by means of a number of laminated copper conductors 16 made of relatively thin flat copper bands. In this way the circuit to the work is limited to three connections only, one at terminal 11, one at terminal 12, and one at lug 14. The bands are generally four to six inches wide, and in this instance two sets of laminated band conductors are bolted side by side to terminal 12 and lug 14 to distribute the current uniformly to the platen. These conducting bands are also of sufficient length to extend upwardly on reversely bowed or curved lines to permit free flexing thereof and to permit the movable work holder 15 to be shifted horizontally without hindrance. Any suitable means may be used for sliding the work holder or movable platen 15 back and forth, although a common mode of operating and controlling the movement of platen 15 is by lever and toggle mechanism connected to an adjustable connecting rod 17 attached to one end of platen 15.

Movable platen 15 supports the other part or piece 7' to be welded, and this piece projects over the inner end edge of the platen opposite the other part or piece 7, thereby forming a gap or space between the opposing ends of the two platens or work holders. The transformer is located at one side of this gap or space beneath platen 6, and to prevent the flash or particles of molten metal and scale from coming in contact with the transformer, I mount a combined shield and chute 18 made of asbestos board or other suitable fireproof insulating material beneath the gap of the machine between copper secondary 10 of the transformer and the flexible copper conductor bands 16. Chute 18 is open at its top and directly in line with the flash which strikes the inclined bottom 19 of the chute and is carried downwardly to the rear of the welding machine. The main wall 20 of the shield and chute extends the full width transversely of the machine and protects the transformer suspended adjacent thereto, and the operator at the front of the machine is also protected by this shield or chute. A slot or opening 21 is formed in wall 20 to permit terminal 12 to project therethrough.

By bolting or suspending the transformer upon table 4 or bed plate 2 no other support, such as a shelf or bracket is required, and where the transformer is suspended from an adjustable plate or table 4 as shown the entire unit may be shifted or moved within limits in various directions to facilitate adjustments of the dies or workholders and also the pieces of work relatively to each other.

What I regard as my invention or discovery and desire to claim, is—

An electric flash welding or heating machine, comprising a bed plate having a separate table adjustably mounted at one end thereof and provided with a work-holding member mounted thereon, a slidable table at its opposite end also provided with a work-holding member, an electric transformer rigidly secured to said adjustable table having flexible laminated conductors connecting the secondary of the transformer with a terminal of the work-holding member of the slidable table and a protecting wall and chute member fixed to said bed plate and extending to the rear end of the machine, said wall and chute member being formed of two parallel plates having an integral connecting web portion extending downwardly to the rear end of the machine to provide a chute, and a slot therein arranged below said web portion to permit electric connection of the secondary to the work-holding member of the sliding table.

In testimony whereof I affix my signature.

ALBERTIS C. TAYLOR.